United States Patent
Kirk

(10) Patent No.: US 9,256,980 B2
(45) Date of Patent: Feb. 9, 2016

(54) INTERPOLATING ORIENTED DISKS IN 3D SPACE FOR CONSTRUCTING HIGH FIDELITY GEOMETRIC PROXIES FROM POINT CLOUDS

(75) Inventor: Adam Kirk, Renton, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 411 days.

(21) Appl. No.: 13/614,852

(22) Filed: Sep. 13, 2012

(65) Prior Publication Data
US 2013/0321418 A1 Dec. 5, 2013

Related U.S. Application Data

(60) Provisional application No. 61/653,983, filed on May 31, 2012.

(51) Int. Cl.
*G06T 17/00* (2006.01)
*G06T 15/04* (2011.01)

(52) U.S. Cl.
CPC .............. *G06T 17/00* (2013.01); *G06T 15/04* (2013.01); *G06T 2210/56* (2013.01)

(58) Field of Classification Search
CPC combination set(s) only.
See application file for complete search history.

(56) References Cited

U.S. PATENT DOCUMENTS

| | | | |
|---|---|---|---|
| 5,850,352 A | 12/1998 | Moezzi et al. | |
| 5,926,400 A | 7/1999 | Kytle et al. | |
| 6,072,496 A | 6/2000 | Guenter | |
| 6,226,003 B1 | 5/2001 | Akeley | |
| 6,327,381 B1 | 12/2001 | Rogina et al. | |
| 6,496,601 B1 | 12/2002 | Migdal | |
| 6,509,902 B1 * | 1/2003 | Pfister et al. | 345/582 |
| 6,556,199 B1 | 4/2003 | Fang et al. | |
| 6,750,873 B1 | 6/2004 | Bernardini et al. | |
| 6,781,591 B2 | 8/2004 | Raskar | |
| 6,968,299 B1 * | 11/2005 | Bernardini et al. | 703/2 |
| 7,023,432 B2 | 4/2006 | Fletcher | |
| 7,096,428 B2 | 8/2006 | Foote | |
| 7,106,358 B2 | 9/2006 | Valliath | |
| 7,142,209 B2 | 11/2006 | Uyttendaele | |
| 7,286,143 B2 | 10/2007 | Kang | |
| 7,348,976 B2 | 3/2008 | Mori | |
| 7,551,232 B2 | 6/2009 | Winger | |
| D610,105 S | 2/2010 | Graham | |

(Continued)

OTHER PUBLICATIONS

Mamou, K. et al., A simple and efficient approach for 3D mesh approximate convex decomposition, 16th Int'l Conf. on Image Processing, ICIP, Nov. 2009, pp. 3501-3504, Cairo, Egypt.

(Continued)

*Primary Examiner* — Leon T Cain, II
(74) *Attorney, Agent, or Firm* — Cassandra T. Swain; Danielle Johnston Holmes; Micky Minhas

(57) ABSTRACT

An "Oriented Disk Interpolator" provides various techniques for interpolating between points in a point cloud using RGB images (or images in other color spaces) to produce a smooth implicit surface representation that can then be digitally sampled for ray-tracing or meshing to create a high fidelity geometric proxy from the point cloud. More specifically, the Oriented Disk Interpolator uses image color-based consistency to build an implicit surface from oriented points and images of the scene by interpolating disks in 3D space relative to a point cloud of a scene or objects within the scene. The resulting implicit surface is then available for a number of uses, including, but not limited to, constructing a high fidelity geometric proxy.

20 Claims, 4 Drawing Sheets

(56) References Cited

U.S. PATENT DOCUMENTS

| | | |
|---|---|---|
| 7,671,893 B2 | 3/2010 | Li |
| 7,702,016 B2 | 4/2010 | Winder |
| 7,778,491 B2 | 8/2010 | Steedly |
| 7,840,638 B2 | 11/2010 | Zhang |
| 8,036,491 B2 | 10/2011 | Matsui |
| 8,106,924 B2 | 1/2012 | Aliprandi et al. |
| 8,156,239 B1 | 4/2012 | Ashrafi |
| 8,411,126 B2 | 4/2013 | Lee et al. |
| 8,441,482 B2 | 5/2013 | Ozdac et al. |
| 2002/0186216 A1 | 12/2002 | Baumberg et al. |
| 2002/0196256 A1 | 12/2002 | Hoppe |
| 2003/0038892 A1 | 2/2003 | Wang et al. |
| 2003/0085992 A1 | 5/2003 | Arpa et al. |
| 2003/0218672 A1 | 11/2003 | Zhang |
| 2004/0044441 A1 | 3/2004 | Gupta et al. |
| 2004/0217956 A1 | 11/2004 | Besl et al. |
| 2005/0001832 A1 | 1/2005 | Shen et al. |
| 2005/0013465 A1 | 1/2005 | Southall et al. |
| 2005/0017969 A1 | 1/2005 | Sen |
| 2005/0052452 A1 | 3/2005 | Baumberg |
| 2005/0075167 A1 | 4/2005 | Beaulieu et al. |
| 2005/0280646 A1 | 12/2005 | Wang |
| 2005/0285875 A1 | 12/2005 | Kang |
| 2005/0286759 A1 | 12/2005 | Zitnick, III et al. |
| 2006/0023782 A1 | 2/2006 | Cai |
| 2006/0028473 A1 | 2/2006 | Uyttendaele |
| 2006/0028489 A1 | 2/2006 | Uyttendaele |
| 2006/0158509 A1 | 7/2006 | Kenoyer |
| 2006/0221072 A1 | 10/2006 | Se et al. |
| 2006/0262856 A1 | 11/2006 | Wu |
| 2006/0267977 A1 | 11/2006 | Barfuss et al. |
| 2006/0290695 A1 | 12/2006 | Salomie |
| 2007/0070177 A1 | 3/2007 | Christensen |
| 2007/0236656 A1 | 10/2007 | Jeong |
| 2007/0237420 A1 | 10/2007 | Steedly et al. |
| 2007/0263080 A1 | 11/2007 | Harrell |
| 2008/0043024 A1 | 2/2008 | Schiwietz et al. |
| 2008/0088626 A1 | 4/2008 | Habe |
| 2008/0095465 A1 | 4/2008 | Mullick et al. |
| 2008/0298571 A1 | 12/2008 | Kurtz et al. |
| 2009/0016641 A1 | 1/2009 | Paladini et al. |
| 2009/0033740 A1 | 2/2009 | Ishikawa |
| 2009/0109280 A1 | 4/2009 | Gotsman |
| 2009/0128548 A1 | 5/2009 | Gloudemans |
| 2009/0128568 A1 | 5/2009 | Gloudemans et al. |
| 2009/0215533 A1 | 8/2009 | Zalewski et al. |
| 2009/0290811 A1 | 11/2009 | Imai |
| 2009/0315978 A1 | 12/2009 | Wurmlin et al. |
| 2010/0026712 A1 | 2/2010 | Aliprandi |
| 2010/0080448 A1 | 4/2010 | Tam |
| 2010/0142824 A1 | 6/2010 | Lu |
| 2010/0158388 A1 | 6/2010 | Bookout |
| 2010/0201681 A1 | 8/2010 | Criminisi |
| 2010/0225735 A1 | 9/2010 | Shaffer |
| 2010/0254627 A1 | 10/2010 | Panahpour Tehrani et al. |
| 2010/0259595 A1 | 10/2010 | Trimeche |
| 2010/0262628 A1 | 10/2010 | Singer |
| 2010/0265248 A1 | 10/2010 | McCrae |
| 2010/0303303 A1 | 12/2010 | Shen et al. |
| 2010/0321378 A1 | 12/2010 | Betzler |
| 2010/0328437 A1 | 12/2010 | Lee |
| 2010/0328475 A1 | 12/2010 | Thomas |
| 2010/0329358 A1 | 12/2010 | Zhang |
| 2011/0032251 A1 | 2/2011 | Pothana |
| 2011/0050859 A1 | 3/2011 | Kimmel |
| 2011/0058021 A1 | 3/2011 | Chen |
| 2011/0084983 A1 | 4/2011 | Demaine |
| 2011/0093273 A1 | 4/2011 | Lee |
| 2011/0096832 A1 | 4/2011 | Zhang |
| 2011/0122225 A1 | 5/2011 | Kim et al. |
| 2011/0142321 A1 | 6/2011 | Huffman |
| 2011/0169824 A1 | 7/2011 | Fujinami |
| 2011/0181685 A1 | 7/2011 | Saleh |
| 2011/0211749 A1 | 9/2011 | Tan |
| 2011/0252320 A1 | 10/2011 | Arrasvuori et al. |
| 2011/0261050 A1 | 10/2011 | Smolic et al. |
| 2011/0267344 A1 | 11/2011 | Germann et al. |
| 2011/0304619 A1 | 12/2011 | Fu et al. |
| 2012/0075303 A1 | 3/2012 | Johnsson |
| 2012/0114039 A1 | 5/2012 | Wang |
| 2012/0127267 A1 | 5/2012 | Zhang et al. |
| 2012/0141016 A1 | 6/2012 | Wildeboer et al. |
| 2012/0155680 A1 | 6/2012 | Chen et al. |
| 2013/0039632 A1 | 2/2013 | Feinson |
| 2013/0257853 A1 | 10/2013 | Schmidt |
| 2013/0286204 A1 | 10/2013 | Cheng |
| 2014/0219550 A1 | 8/2014 | Popa et al. |

OTHER PUBLICATIONS

Wills, Diane M., U.S. Notice of Allowance, U.S. Appl. No. 13/599,263, Aug. 21, 2014, pp. 1-7.

Li, et al., "Joint View Filtering for Multiview Depth Map Sequences", In 19th IEEE International Conference on Image Processing, Sep. 30, 2012, pp. 1329-1332.

Morvan, et al., "Multiview Depth-Image Compression Using an Extended H.264 Encoder", In Advanced Concept for Intelligent Vision Systems, Aug. 28, 2007, pp. 675-686.

Ochotta, et al., "Image-Based Surface Compression", In Computer Graphics Forum, vol. 27, Issue 6, Sep. 1, 2008, 15 Pages.

Park et al., "Efficient Depth Compression Based on Partial Surface for 3-D Object Represented by Layered Depth Images", In IEEE Signal Processing Letters, vol. 17, Issue 10, Oct. 1, 2010, pp. 839-842.

Sun, et al., "Rate-Distortion Optimized 3D Reconstruction from Noise-Corrupted Multi view Depth Videos", In IEEE International Conference on Multimedia and Expo, Jul. 15, 2013, pp. 1-6.

Aliaga, D. G., I. Carlbom, A spatial image hierarchy for compression in image-based-rendering, Proc. of the 2005 Int'l Conf. on Image Processing, ICIP 2005, Sep. 11-14, 2005, pp. 609-612, vol. 1, Genoa, Italy.

Arsenault, R., C. Ware, Frustum view angle, observer view angle and VE navigation, Proc. of the 5th Symposium on Virtual Reality, Oct. 7-10, 2002, Fortaleza, CE, Brazil.

Berger, K., K. Ruhl, Y. Schroeder, C. Bruemmer, A. Scholz, M. A. Magnor, Markerless motion capture using multiple color-depth sensors, Proc. of the Vision, Modeling, and Visualization Workshop 2011, VMV 2011, Oct. 4-6, 2011, pp. 317-324, Berlin, Germany.

Bogomjakov, A., C. Gotsmann, M. Magnor, Free-viewpoint video from depth cameras, Proc. Vision, Modeling and Visualization, Nov. 2006, pp. 89-96.

Boukerche, A., R. Jarrar, R. W. Pazzi, A novel interactive streaming protocol for image-based 3D virtual environment navigation, Proc. of IEEE Int'l Conf. on Communications, ICC 2009, Jun. 14-18, 2009, pp. 1-6, Dresden, Germany.

Carranza, J., C. Theobalt, M. A. Magnor, H.-P. Seidel, Free-viewpoint video of human actors, ACM Trans. Graph., Jul. 2003, pp. 569-577, vol. 22, No. 3.

Deering, M., Geometry compression, Proc. of the 22nd Annual Conf. on Comp. Graphics and Interactive Techniques, SIGGRAPH 1995, Aug. 6-11, 1995, pp. 13-20, Los Angeles, CA, USA.

Do, L., S. Zinger, P.H.N. de With, Quality improving techniques for free-viewpoint DIBR, 3DTV-Conference: The True Vision Capture, Transmission and Display of 3D Video, May 4-6, 2009, pp. 1-4, Potsdam, Germany.

Eisemann, M., F. Klose, M. A. Magnor, Towards plenoptic Raumzeit reconstruction, Video Processing and Computational Video—International Seminar, Oct. 10-15, 2010, pp. 1-24, Dagstuhl Castle, Germany.

Eisert, P., Virtual video conferencing using 3D model-assisted image-based rendering, The 2nd IEE European Conf. on Visual Media Production, CVMP 2005, Nov. 30-Dec. 1, 2005, pp. 185-193.

Ekmekcioglu, E., B. Gunel, M. Dissanayake, S. T. Worrall, A. M. Kondoz, A scalable multi-view audiovisual entertainment framework with content-aware distribution, 17th IEEE Int'l Conf. on Image Processing, ICIP 2010, Sep. 26-29, 2010, pp. 2401-2404, Hong Kong.

(56) References Cited

OTHER PUBLICATIONS

Fitzgibbon, A. W., Y. Wexler, A. Zisserman, Image-based rendering using image-based priors, 9th IEEE Int'l Conf. on Comp. Vision, ICCV 2003, Oct. 14-17, 2003, pp. 1176-1183, Nice, France.
Grau, O., Multi-view 4D reconstruction of human action for entertainment applications, Research and Development White Paper, British Broadcasting Company, Nov. 2011, pp. 1-21.
Guillemaut, J.-Y., A. Hilton, Joint multi-layer segmentation and reconstruction for free-viewpoint video applications, Int'l J. of Comp. Vision, May 2011, pp. 73-100, vol. 93, No. 1.
Hornung, A., L. Kobbelt, Interactive pixel-accurate free viewpoint rendering from images with silhouette aware sampling, Comput. Graph. Forum, Dec. 2009, pp. 2090-2103, vol. 28, No. 8.
Kilner, J., J. Starck, A. Hilton, A comparative study of free-viewpoint video techniques for sports events, European Conf. on Visual Media Production, Nov. 29-30, 2006, pp. 87-96.
Kim, Y. M., D. Chan, C. Theobalt, S. Thrun, Design and calibration of a multi-view TOF sensor fusion system, IEEE Comp. Society Conf. on Comp. Vision and Pattern Recognition Workshops, CVPRW 2008, Jun. 23-28, 2008, pp. 1-7.
Kurashima, C. S., R. Yang, A. Lastra, Combining approximate geometry with view-dependent texture mapping—A hybrid approach to 3D video teleconferencing, 15th Brazilian Symposium on Comp. Graphics and Image Processing, SIBGRAPI 2002, Oct. 7-10, 2002, pp. 112-119, Fortaleza-CE, Brazil.
Kuster, C., T. Popa, C. Zach, C. Gotsman, M. H. Gross, FreeCam: A hybrid camera system for interactive free-viewpoint video, Proc. of the Vision, Modeling, and Visualization Workshop 2011, VMV 2011, Oct. 4-6, 2011, pp. 17-24, Berlin, Germany.
Lai, K.-K., Y.-L. Chan, C.-H. Fu, W.-C. Siu, Viewpoint switching in multiview videos using SP-frames, Proc. of the Int'l Conf. on Image Processing, ICIP 2008, Oct. 12-15, 2008, pp. 1776-1779, San Diego, California, USA.
Lamboray, E., S. Würmlin, M. Waschbüsch, M. H. Gross, H. Pfister, Unconstrained free-viewpoint video coding, Proc. of the 2004 Int'l Conf. on Image Processing, ICIP 2004, Oct. 24-27, 2004, pp. 3261-3264, Singapore.
Lei, C., Y.-H. Yang, Efficient geometric, photometric, and temporal calibration of an array of unsynchronized video cameras, Sixth Canadian Conf. on Comp. and Robot Vision, CRV 2009, May 25-27, 2009, pp. 162-169, Kelowna, British Columbia, Canada.
Lipski, C., C. Linz, K. Berger, A. Sellent, M. A. Magnor, Virtual video camera: Image-based viewpoint navigation through space and time, Comput. Graph. Forum, Dec. 2010, pp. 2555-2568, vol. 29, No. 8.
Liu, Y., Q. Dai, W. Xu, A point-cloud-based multiview stereo algorithm for free-viewpoint video, IEEE Trans. Vis. Comput. Graph., May/Jun. 2010, pp. 407-418, vol. 16, No. 3.
Liu, S., K. Kang, J.-P. Tarel, D. B. Cooper, Free-form object reconstruction from silhouettes, occluding edges and texture edges: A unified and robust operator based on duality, IEEE Trans. Pattern Anal. Mach. Intell., Jan. 2008, pp. 131-146, vol. 30, No. 1.
Lu, Z., Y.-W. Tai, M. Ben-Ezra, M. S. Brown, A framework for ultra high resolution 3D imaging, The Twenty-Third IEEE Conf. on Comp. Vision and Pattern Recognition, CVPR 2010, Jun. 13-18, 2010, pp. 1205-1212, San Francisco, CA, USA.
Morvan, Y., D. Farin, P. De With, System architecture for free-viewpoint video and 3D-TV, IEEE Transactions on Consumer Electronics, May 2008, pp. 925-932, vol. 54, No. 2.
Nabeshima, R., M. Ueda, D. Arita, R. Taniguchi, Frame rate stabilization by variable resolution shape reconstruction for on-line free-viewpoint video generation, Proc. of the 7th Asian Conf. on Comp. Vision, Jan. 13-16, 2006, pp. 81-90, Hyderabad, India.
Piatti, D., Time-of-flight cameras: Tests, calibration and multi-frame registration for automatic 3D object reconstruction, 2011, pp. 1-10.
Shi, S., W. J. Jeon, K. Nahrstedt, R. H. Campbell, Real-time remote rendering of 3D video for mobile devices, Proc. of the 17th Int'l Conf. on Multimedia 2009, ACM Multimedia 2009, Oct. 19-24, 2009, pp. 391-400, Vancouver, British Columbia, Canada.
Smolić, A., K. Müller, P. Merkle, T. Rein, M. Kautzner, P. Eisert, T. Wiegand, Free viewpoint video extraction, representatiion, coding, and rendering, Proc. of the 2004 Int'l Conf. on Image Processing, ICIP 2004, Oct. 24-27, 2004, pp. 3287-3290, vol. 5, Singapore.
Smolić, A., P. Kauff, Interactive 3D video representation and coding technologies, Invited Paper, Proc. of the IEEE, Special Issue on Advances in Video Coding and Delivery, Jan. 2005, pp. 98-110, vol. 93, No. 1.
Starck, J., J. Kilner, A. Hilton, A free-viewpoint video renderer, J. Graphics, GPU, & Game Tools, 2009, pp. 57-72, vol. 14, No. 3.
Kilner, J., J. Starck, J.-Y. Guillemaut, A. Hilton, Objective quality assessment in free-viewpoint video production, Sig. Proc.: Image Comm., Jan. 2009, pp. 3-16, vol. 24, No. 1-2.
Starck, J., J. Kilner, A. Hilton, Objective quality assessment in free-viewpoint video production, 3DTV Conf.: The True Vision—Capture, Transmission and Display of 3D Video, May 28-30, 2008, pp. 225-228, Istanbul, Turkey.
Theobalt, C., M. Li, M. A. Magnor, H.-P. Seidel, A flexible and versatile studio for synchronized multi-view video recording, Vision, Video, and Graphics, VVG 2003, Jul. 10-11, 2003, pp. 9-16, University of Bath, UK.
Tian, D. P.-L. Lai, P. Lopez, C. Gomila, View synthesis techniques for 3D video, Proc. of the SPIE Applications of Digital Image Processing XXXII, Sep. 2009, pp. 74430T-74430T-11, vol. 7443.
Vertegaal, R., I. Weevers, C. Sohn, C. Cheung, GAZE-2: Conveying eye contact in group video conferencing using eye-controlled camera direction, Proc. of the 2003 Conf. on Human Factors in Computing Systems, CHI 2003, Apr. 5-10, 2003, pp. 521-528, Ft. Lauderdale, Florida, USA.
Wei, X., L. Yin, Z. Zhu, Q. Ji, Avatar-mediated face tracking and lip reading for human computer interaction, Proc. of the 12th ACM Int'l Conf. on Multimedia, ACM Multimedia 2004, Oct. 10-16, 2004, pp. 500-503, New York, NY, USA.
Wikipedia, Hidden surface determination, Apr. 23, 2012, pp. 1-4.
Würmlin, S., E. Lamboray, M. Waschbüsch, M. Gross, Dynamic point samples for free-viewpoint video, Proc. of the Picture Coding Symposium, Dec. 15-17, 2004, pp. 6, San Francisco, CA.
Würmlin, S., E. Lamboray, M. Waschbüsch, P. Kaufman, A. Smolić, M. Gross, Image-space free-viewpoint video, Vision, Modeling, and Visualization, VMV 2005, Nov. 16-18, 2005, pp. 453-460, Erlangen, Germany.
Yea, S., A. Vetro, View synthesis prediction for multiview video coding, Sig. Proc.: Image Comm., Jan. 2009, pp. 89-100, vol. 24, No. 1-2.
Yea, S., A. Vetro, View synthesis prediction for rate-overhead reduction in FTV, 3DTV Conf.: The True Vision—Capture, Transmission and Display of 3D Video, May 28-30, 2008, pp. 145-148, Istanbul, Turkey.
Zhu, Y., A novel view multi-view synthesis approach for free viewpoint video, Int'l Joint Conf. on Artificial Intelligence, JCAI '09, Apr. 25-26, 2009, pp. 88-91, Hainan Island, China.
Ziegler, G., H. P. A. Lensch, M. Magnor, H.-P. Seidel, Multi-video compression in texture space using 4D SPIHT, 2004 IEEE 6th Workshop on Multimedia Signal Processing, Sep. 29-Oct. 1, 2004, pp. 39-42, MPI Informatik, Saarbrucken, Germany.
Zitnick, C. L., S. B. Kang, M. Uyttendaele, S. A. J. Winder, R. Szeliski, High-quality video view interpolation using a layered representation, ACM Trans. Graph., Aug. 2004, pp. 600-608, vol. 23, No. 3.
Cooper, O. D., Robust generation of 3D models from video footage of urban scenes, Ph.D Thesis, University of Bristol, Mar. 2005.
Gautier, J., E. Bosc, L. Morin, Representation and coding of 3D video data, Nov. 17, 2010, pp. 1-43.
Goldlücke, B., Multi-camera reconstruction and rendering for free-viewpoint video, Ph.D. Thesis, Nov. 29, 2006, pp. 1-164, Max-Planck-Institut für Informatik.
Li, W., Free viewpoint video with image-based rendering, Ph.D Dissertation, May 2010, pp. 1-151, Arizona State University.
Pollefeys, M., D. Nistér, J.-M. Frahm, A. Akbarzadeh, P. Mordohai, B. Clipp, C. Engels, D. Gallup, S. J. Kim, P. Merrell, C. Salmi, S. N. Sinha, B. Talton, L. Wang, Q. Yang, H. Stewénius, R. Yang, G. Welch, H. Towles, Detailed real-time urban 3D reconstruction from video, Int'l J. of Comp. Vision, Jul. 2008, pp. 143-167, vol. 78, No. 2-3.

(56) References Cited

OTHER PUBLICATIONS

Sugden, B., M. Iwanicki, Mega meshes: Modelling, rendering and lighting a world made of 100 billion polygons, Game Developers Conf., Feb. 28-Mar. 4, 2011, pp. 1-67, San Francisco, CA.

Morvan, Y., and C. O'Sullivan, Visual tuning of an image-based rendering algorithm, Proceedings of Eurographics, Oct. 2006, pp. 1-6, Ireland, Dublin.

Chang et al., Principal Component Analysis-based Mesh Decomposition, J. Inf. Sci. Eng., May 2009, vol. 25, No. 4, pp. 971-987.

Kalvin et al., Superfaces: Polygonal Mesh Simplification with Bounded Error, J. IEEE Comp. Graphics and Applications, May 1996, vol. 16, No. 3, pp. 64-77.

Kanade et al., Virtualized Reality: Constructing Virtual Worlds from Real Scenes, IEEE Multimedia, Immersive Telepresence, Jan. 1997, vol. 4, No. 1, pp. 34-47.

Morvan, Y., C. O'Sullivan, Visual Tuning of an Image-Based Rendering Algorithm, Proc. of Eurographics, Oct. 2006, pp. 1-6, Ireland, Dublin.

Newcombe et al., Live Dense Reconstruction with a Single Moving Camera, The Twenty-Third IEEE Conf. on Comp. Vision and Pattern Recognition, CVPR 2010, Jun. 2010, pp. 1498-1505, San Francisco, CA, USA.

Rus et al., Analysing the Influence of Vertex Clustering on PCA-Based Dynamic Mesh Compression, Proc. of the 6th Int'l Conf. on Articulated Motion and Deformable Objects, AMDO 2010, Jul. 2010, pp. 55-66, Port d'Andratx, Mallorca, Spain.

Rusinkiewicz et al., Qsplat: A Multiresolution Point Rendering System for Large Meshes, Proc. of the 27th Annual Conf. on Comp. Graphics, SIGGRAPH 2000, Jul. 23-28, 2000, pp. 343-352, New Orleans, Louisiana, USA.

Wikipedia, K-d-tree.pdf, May 2, 2012, p. 1.

Yang, Yi, U.S. Office Action, U.S. Appl. No. 13/566,796, Apr. 18, 2014, pp. 1-13.

Wills, Diane M., U.S. Office Action, U.S. Appl. No. 13/599,263, May 29, 2014, pp. 1-19.

Cooke et al., Multiple image view synthesis for free viewpoint video applications, IEEE International Conference on Image Processing, Sep. 2005, vol. 1, pp. 1-4.

Mathis, Normal map workflow, Oct. 18, 2005, http://www.poopinmymouth.com/tutorial/normal_workflow.htm.

Miller, G., High quality novel view rendering from multiple cameras, Doctor of Philosphy, University of Surrey, Centre for Vision, Speech and Signal Processing, School of Electronics and Physical Sciences, Dec. 2007, pp. 1-173.

Zinger, Free-viewpoint depth image based rendering, Preprint submitted to Visual Communication and Image Representation, Jun. 26, 2009, pp. 1-27.

Yang, Yi, U.S. Office Action, U.S. Appl. No. 13/566,796, Feb. 12, 2015, pp. 1-12.

Wu, Chong, U.S. Office Action, U.S. Appl. No. 13/744,885, Feb. 12, 2015, pp. 1-19.

Nguyen, Kimbinh, U.S. Office Action, U.S. Appl. No. 13/599,436, Mar. 2, 2015, pp. 1-17.

Joshi, Sunita, U.S. Office Action, U.S. Appl. No. 13/599,678, Apr. 1, 2015, pp. 1-32.

Hajnik, Daniel F., U.S. Final Office Action, U.S. Appl. No. 13/599,170, Jan. 27, 2015, pp. 1-29.

Abimbola, Kehinde, U.S. Office Action, U.S. Appl. No. 13/588,917, Mar. 4, 2015, pp. 1-36.

Matthies, L., M. Okutomi, A Bayesian foundation for active stereo vision, Proc. of SPIE Conf. 1198, Sensor Fusion II: Human and Machine Strategies, Nov. 1989, pp. 62-74.

Rankin, A. L., C. F. Bergh, S. B. Goldberg, P. Bellutta, A. Huertas, L. H. Matthies, Passive perception system for day/night autonomous off-road navigation, Proc. SPIE, Jun. 2, 2005, vol. 5804, Unmanned Ground Vehicle Technology VII, pp. 343-358.

Würmlin, S., E. Lamboray, M. Gross, 3D video fragments: Dynamic point samples for real-time free-viewpoint video, Computers and Graphics, Feb. 2004, vol. 28, No. 1, pp. 3-14.

Yang, Yi, U.S. Final Office Action, U.S. Appl. No. 13/566,796, Sep. 5, 2014, pp. 1-13.

Hajnik, Daniel F., U.S. Office Action, U.S. Appl. No. 13/599,170, Sep. 30, 2014, pp. 1-25.

Kurutepe, E., Civanlar, M.R., Tekalp, A.M., Client-driven selective streaming of multiview video for interactive 3DTV, IEEE Transactions on Circuits and Systems for Video Technology, Nov. 2007, vol. 17, No. 11, pp. 1558-1565.

Yang, Z., Yu, B., Nahrstedt, K., Bajscy, R., A multi-stream adaptation framework for bandwidth management in 3D tele-immersion, May 2006, Proc. of the 2006 Int'l Workshop on Network and operating systems support for digital audio and video, pp. 14.

Nguyen, Phung Hoang Joseph, U.S. Office Action, U.S. Appl. No. 13/602,097, Jun. 1, 2015, pp. 1-9.

Teitelbaum, Michael E., U.S. Office Action, U.S. Appl. No. 13/566,877, Jun. 8, 2015, pp. 1-13.

Ma, Tze, U.S. Office Action, U.S. Appl. No. 13/598,536, Jun. 26, 2015, pp. 1-16.

Yang, Yi, U.S. Final Office Action, U.S. Appl. No. 13/566,796, Jun. 30, 2015, pp. 1-13.

He, Weiming, U.S. Office Action, U.S. Appl. No. 13/790,158, Apr. 28, 2015, pp. 1-27.

Nguyen, Kimbinh, U.S. Final Office Action, U.S. Appl. No. 13/599,436, Jun. 19, 2015, pp. 1-20.

Hajnik, Daniel F., U.S. Office Action, U.S. Appl. No. 13/599,170, May 18, 2015, pp. 1-25.

Petit, B., J.-D. Lesage, C. Menier, J. Allard, J.-S. Franco, B. Raffin, E. Boyer, F. Faure, Multicamera Real-Time 3D Modeling for Telepresence and Remote Collaboration, Int'l J. of Digital Multimedia Broadcasting, 2010, vol. 2010, pp. 1-12.

Roberts, M., A work-efficient GPU algorithm for level set segmentation, High Performance Graphics, Jun. 25-27, 2010, https://vimeo.com/24167006.

Teitelbaum, Michael E., U.S. Final Office Action, U.S. Appl. No. 13/566,877, Sep. 1, 2015, pp. 1-15.

Ma, Tize, U.S. Final Office Action, U.S. Appl. No. 13/598,536, Nov. 3, 2015, pp. 1-20.

Satti, Humam M., U.S. Office Action, U.S. Appl. No. 13/598,747, Oct. 8, 2015, pp. 1-9.

Wu, Chong, U.S. Final Office Action, U.S. Appl. No. 13/744,885, Aug. 13, 2015, pp. 1-30.

He, Weiming, U.S. Final Office Action, U.S. Appl. No. 13/790,158, Aug. 13, 2015, pp. 1-31.

Nguyen, Kimbinh, U.S. Notice of Allowance, U.S. Appl. No. 13/599,436, Oct. 13, 2015, pp. 1-5.

Joshi, Sunita, U.S. Office Action, U.S. Appl. No. 13/599,678, Aug. 17, 2015, pp. 1-26.

Hajnik, Daniel F., U.S. Final Office Action, U.S. Appl. No. 13/599,170, Oct. 20, 2015, pp. 1-13.

Abimbola, Kehinde, U.S. Notice of Allowance, U.S. Appl. No. 13/588,917, Sep. 2, 2015, pp. 1-8.

* cited by examiner

INTERPOLATING ORIENTED DISKS IN 3D SPACE FOR CONSTRUCTING HIGH FIDELITY GEOMETRIC PROXIES FROM POINT CLOUDS

CROSS-REFERENCE TO RELATED APPLICATIONS

This application claims the benefit and priority under Title 35, U.S. Code, Section 119(e), of a previously filed U.S. Provisional Patent Application, Ser. No. 61/653,983 filed on May 31, 2012, by Simonnet, et al., and entitled "INTERACTIVE SPATIAL VIDEO," the subject matter of which is incorporated herein by reference.

BACKGROUND 3D reconstruction is generally a difficult problem that involves capturing large amounts of data using large sensor arrays to obtain and process both depth and RGB data (or data in some other color space). Consequently, accurate generation of high fidelity geometric proxies for use in 3D reconstruction of objects and/or scenes is a complex process. Examples of 3D geometric proxies include, but are not limited to, depth maps, point based renderings, higher order geometric forms such as planes, objects, billboards, models, etc., and high fidelity proxies such as mesh based representations.

A "point cloud" is a set of vertices in a three-dimensional coordinate system that is typically used to represent the external surface of an object. Point clouds are often created by 3D scanners or other sensor arrays including various multi-camera array configurations for capturing 3D surface data. Point clouds are generally used for a variety of purposes, including the creation of geometric proxies by converting the point cloud to polygon or triangle geometric mesh models, NURBS surface models, or other types of geometric proxies using various 3D reconstruction techniques.

Unfortunately, when a point cloud representation of the scene or other object is reconstructed from captured data, there are often artifacts such as noisy or error prone stereo matches that erroneously extend particular boundaries or points within the scene, or of particular objects within the scene. Such artifacts generally lead to incorrect textures appearing on any 3D mesh surface or other geometric proxy derived from the point cloud. Further, where the data available for generating the point cloud is reduced or limited for any reason, the resulting sparsity of the point cloud typically further reduces the fidelity of the resulting geometric proxy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

Point clouds captured using any desired combination of depth and imaging techniques can be used to generate geometric proxies of scenes or objects within a scene. Unfortunately, as the sparsity of the point cloud increases, there are generally large gaps in the surface of the resulting geometric proxy due to the distances between points in the 3D point cloud. Advantageously, an "Oriented Disk Interpolator," as described herein, is capable of addressing such issues whether the point cloud is sparse or dense.

In general, an "Oriented Disk Interpolator," as described herein, provides various techniques for interpolating between points in a point cloud using RGB images (or images in other color spaces) to produce a smooth implicit surface representation that can then be digitally sampled or processed to create a high fidelity geometric proxy corresponding to the point cloud. More specifically, the Oriented Disk Interpolator uses image color-based consistency to build an implicit surface from oriented points by interpolating disks (or other shapes) in 3D space relative to a point cloud of a scene or objects within the scene and images of the scene. The resulting implicit surface is then available for a number of uses, including, but not limited to, constructing a high fidelity geometric proxy.

In view of the above summary, it is clear that the Oriented Disk Interpolator described herein provides various techniques for producing smooth implicit surface representations from point clouds for use in creating high fidelity geometric proxies. In addition to the just described benefits, other advantages of the Oriented Disk Interpolator will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
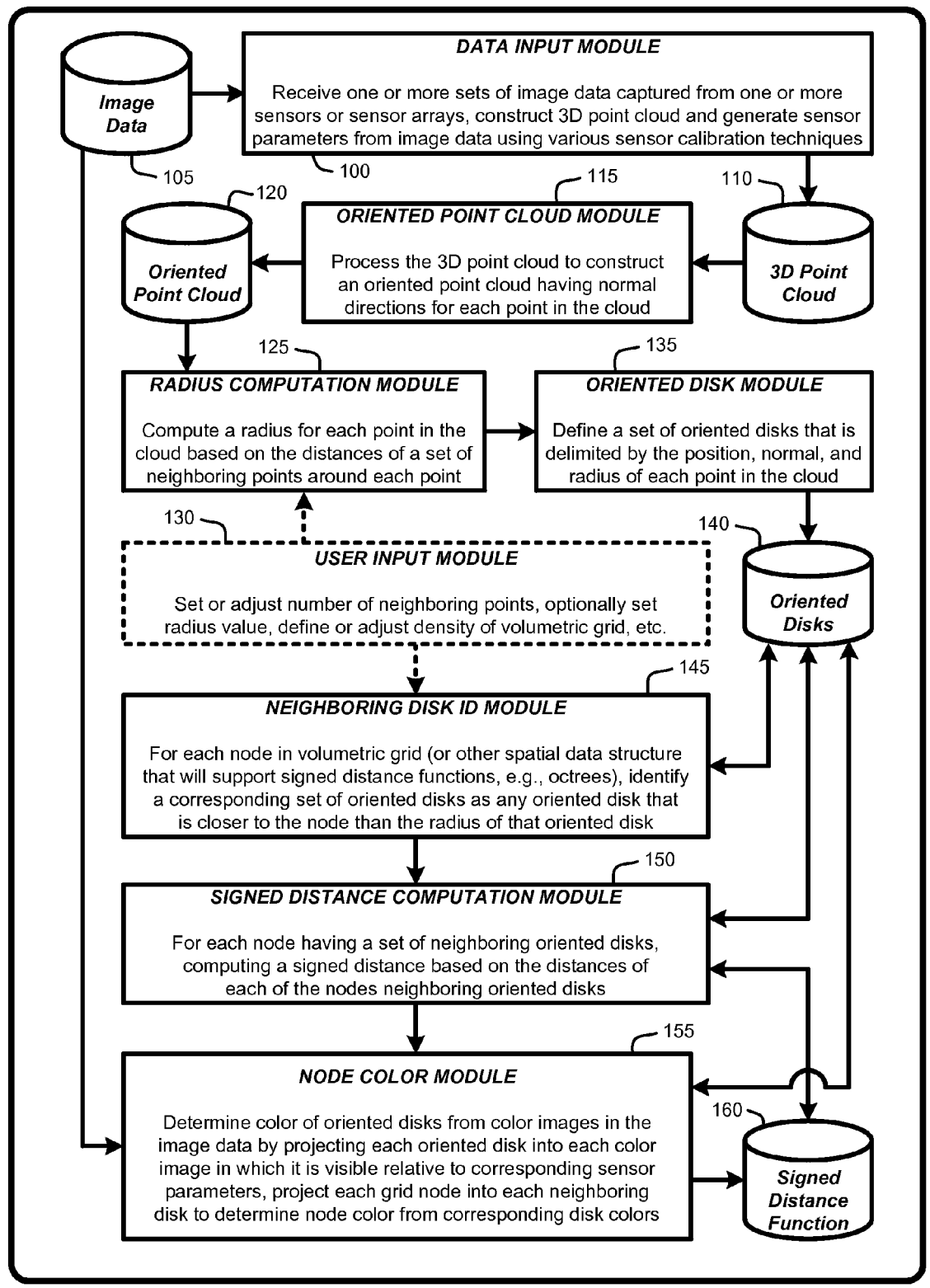
FIG. 1 provides an exemplary architectural flow diagram that illustrates program modules for producing smooth implicit surface representations from point clouds for use in creating high fidelity geometric proxies using an "Oriented Disk Interpolator," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

The following discussion generally refers to point clouds or 3D point clouds of a scene. However, any discussion of point clouds should be understood to apply to entire 3D scenes and/or to one or more 3D objects. Further, note that the following discussion generally refers to RGB images. However, the processes described with respect to an "Oriented Disk Interpolator," as described herein, are adaptable for use with images in any desired color space (e.g., black and white, CMYK, etc.).

Further, the following discussion also refers to sensor geometry and depth maps. In general, as part of the overall process for capturing image data of 3D scenes or objects, the sensors and sensor arrays (e.g., cameras, range finders, time of flight devices, etc.) are calibrated with scale, generating the camera geometry. When sensors are arranged in a 3D space relative to a scene, their type, position, and orientation is referred to as the camera geometry. Various conventional techniques can be used to generate the calibrated sensor geometry for static sensors or sensor arrays as well as for moving sensors or sensor arrays at each point in time during the capture of 3D objects, static 3D scenes or 3D video sequences. Further, the resulting sensor and/or camera calibration parameters are then used, again with conventional techniques, to generate depth maps. The calibration parameters are also used to perform projections of "oriented disks", as discussed in further detail herein. In addition, the depth maps can also be used to generate the point clouds discussed herein using conventional techniques. Note that calibration of sensor data and generation of depth maps are well-known techniques, and will not be described in further detail herein.

As is well known to those skilled in the art, a 3D point cloud is a set of points or vertices in a 3D coordinate system. These vertices are usually defined by x, y, and z coordinates, and typically represent the external surface of an object. 3D point clouds or models can be generated or constructed using a wide variety of techniques. For example, point clouds are often created by 3D scanners, including laser-based scanners, LIDAR systems, etc., and may also be created using other techniques such as, for example, stereo imaging where multiple images of a scene are used to construct pixel or point-based depth maps of scenes or objects in a scene.

In general, an "Oriented Disk Interpolator," as described herein, provides various techniques for interpolating between points in a point cloud using RGB images (or images in other color spaces) to produce a smooth implicit surface representation that can then be digitally sampled for ray-tracing or meshing to create a high fidelity geometric proxy from the point cloud. More specifically, the implicit surface is defined or delimited by any spatial data structure that will support a signed distance function (e.g., octrees, volumetric grids, etc.). However, for purposes of explanation, the following discussion will generally refer to the use of signed distance functions on volumetric grids. In the case of a volumetric grid, the implicit surface is delimited by the signed distance of each node in the volumetric grid. The Oriented Disk Interpolator uses image color-based consistency to build the implicit surface from oriented points and images of the scene by interpolating disks (or other shapes) in 3D space relative to a point cloud of a scene or objects within the scene and the images used to construct or generate the point cloud. The resulting implicit surface is then available for a number of uses, including, but not limited to, constructing a high fidelity geometric proxy.

1.1 System Overview:

As noted above, the "Oriented Disk Interpolator," provides various techniques for producing smooth implicit surface representations from point clouds for use in creating high fidelity geometric proxies. The processes summarized above are illustrated by the general system diagram of FIG. 1. In particular, the system diagram of FIG. 1 illustrates the inter-relationships between program modules for implementing various embodiments of the Oriented Disk Interpolator, as described herein. Furthermore, while the system diagram of FIG. 1 illustrates a high-level view of various embodiments of the Oriented Disk Interpolator, FIG. 1 is not intended to provide an exhaustive or complete illustration of every possible embodiment of the Oriented Disk Interpolator as described throughout this document.

In addition, it should be noted that any boxes and interconnections between boxes that may be represented by broken or dashed lines in FIG. 1 represent alternate embodiments of the Oriented Disk Interpolator described herein, and that any or all of these alternate embodiments, as described below, may be used in combination with other alternate embodiments that are described throughout this document.

In general, as illustrated by FIG. 1, the processes enabled by the Oriented Disk Interpolator begin operation by using a data input module 100 to receive one or more sets of image data 105 that includes images of a scene, and may include other 3D data (e.g., depth information from range finders, etc.) captured from one or more sensors or sensor arrays as an input. The data input module 100 processes this data to construct a 3D point cloud 110 from the image data 105. Note also that an existing 3D point cloud 110 can be provided to the Oriented Disk Interpolator for processing.

An oriented point could module 115 then processes the 3D point cloud 110 to construct an oriented point cloud 120 having normal directions for each point in the oriented point cloud. Note that various conventional techniques exist for determining normals for points in a point cloud to construct an oriented point cloud. Additional techniques are described in Section 2.2.

Given the oriented point cloud, the Oriented Disk Interpolator next uses a radius computation module 125 to determine a radius value for each point in that cloud. More specifically, in various embodiments, the radius computation module 125 compute a radius for each point in the cloud based on the distances of a set of neighboring points around each point. For example, given a user input received from a user input module 130 as to a number of neighboring points to be used, the radius computation module 125 will locate that number of neighbors around each point, and determine the smallest radius from each point sufficient to encompass that number of neighbors. Alternately, the radius can be set as an average or other statistical function of the distances of the neighbors of each point. As such, given a point cloud, or any point cloud in which the distances between points varies, the radius value for each point will also vary. Note also that the user input module 130 is optionally used to set a fixed radius value around each point in the oriented point cloud 120.

Once the radius around each point has been determined by the radius computation module 125, an oriented disk module 135 processes the oriented point cloud 120 in combination with the radius values for each point in that cloud to define a set of oriented disks 140. Each disk in the set of oriented disks 140 is delimited by the position, normal and radius of each point in the oriented point cloud. In other words, the normal of each point is used to orient a disk having a center at the position of that point, and the same radius value as that point.

Next, given the set of oriented disks 140, the Oriented Disk Interpolator uses a neighboring disk ID module 145 in combination with a volumetric grid (or any other spatial data structure, such as octrees, that will support a signed distance function) surrounding the oriented disks in a 3D space to identify a set of neighboring disks for each node of the volumetric grid.

In particular, for each node in the volumetric grid, the neighboring disk ID module 145 identifies a corresponding set of neighboring disks as any oriented disk 140 that is closer to the node than the radius of that oriented disk. Note that a density of the volumetric grid (i.e., spacing or distance between grid nodes) is a fixed or adjustable parameter that can be specified via the user input module 130. Note also that any nodes of the volumetric grid that are sufficiently distant from any of the oriented disks 140 will not have any neighbors (i.e., the set of neighboring disks for such nodes is an empty set) and will therefore not contribute the resulting signed distance function.

Once the set of neighboring disks for each node of the volumetric grid has been identified, the Oriented Disk Interpolator uses a signed distance computation module 150 to compute a signed distance for each of the nodes. In particular, for each node having a set of neighboring oriented disks 140, the signed distance computation module 150 computes a signed distance based on the distances of each of the node's neighboring oriented disks. These signed distances represent a signed distance function 160 corresponding to an implicit surface representation of the 3D scene or object represented by the original 3D point cloud 110. See Section 2.3 for a detailed discussion of computing signed distances for nodes of the volumetric grid based on neighboring oriented disks.

In addition, the Oriented Disk Interpolator determines color values for each node of the volumetric grid using a node color module 155. In particular, the Oriented Disk Interpolator completes the signed distance function 160 by using the node color module 155 to determine a color of each oriented disk from color images in the original image data 105 by projecting each oriented disk into each color image in which it is visible relative to a corresponding depth map. The projection is computed using the calibration parameters. The node color module 155 then projects each grid node into each neighboring disk to determine node color from corresponding disk colors. See Section 2.3 for a detailed discussion of determining node colors in combination with determination of the signed distances for each node of the volumetric grid.

2.0 Operational Details of the Oriented Disk Interpolator:

The above-described program modules are employed for implementing various embodiments of the Oriented Disk Interpolator. As summarized above, the Oriented Disk Interpolator provides various techniques for producing smooth implicit surface representations from point clouds for use in creating high fidelity geometric proxies. The following sections provide a detailed discussion of the operation of various embodiments of the Oriented Disk Interpolator, and of exemplary methods for implementing the program modules described in Section 1 with respect to FIG. 1. In particular, the following sections provides examples and operational details of various embodiments of the Oriented Disk Interpolator, including:

- an operational overview of the Oriented Disk Interpolator;
- robust normal estimation for creating oriented point clouds from point clouds (or other 3D models) received as input;
- using oriented disks to process oriented point clouds for generating a signed distance function of an implicit surface; and
- constructing high fidelity geometric proxies from the signed distance function.

2.1 Operational Overview:

As noted above, the Oriented Disk Interpolator-based processes described herein provide various techniques for producing smooth implicit surface representations from point clouds for use in creating high fidelity geometric proxies.

Figure 2:
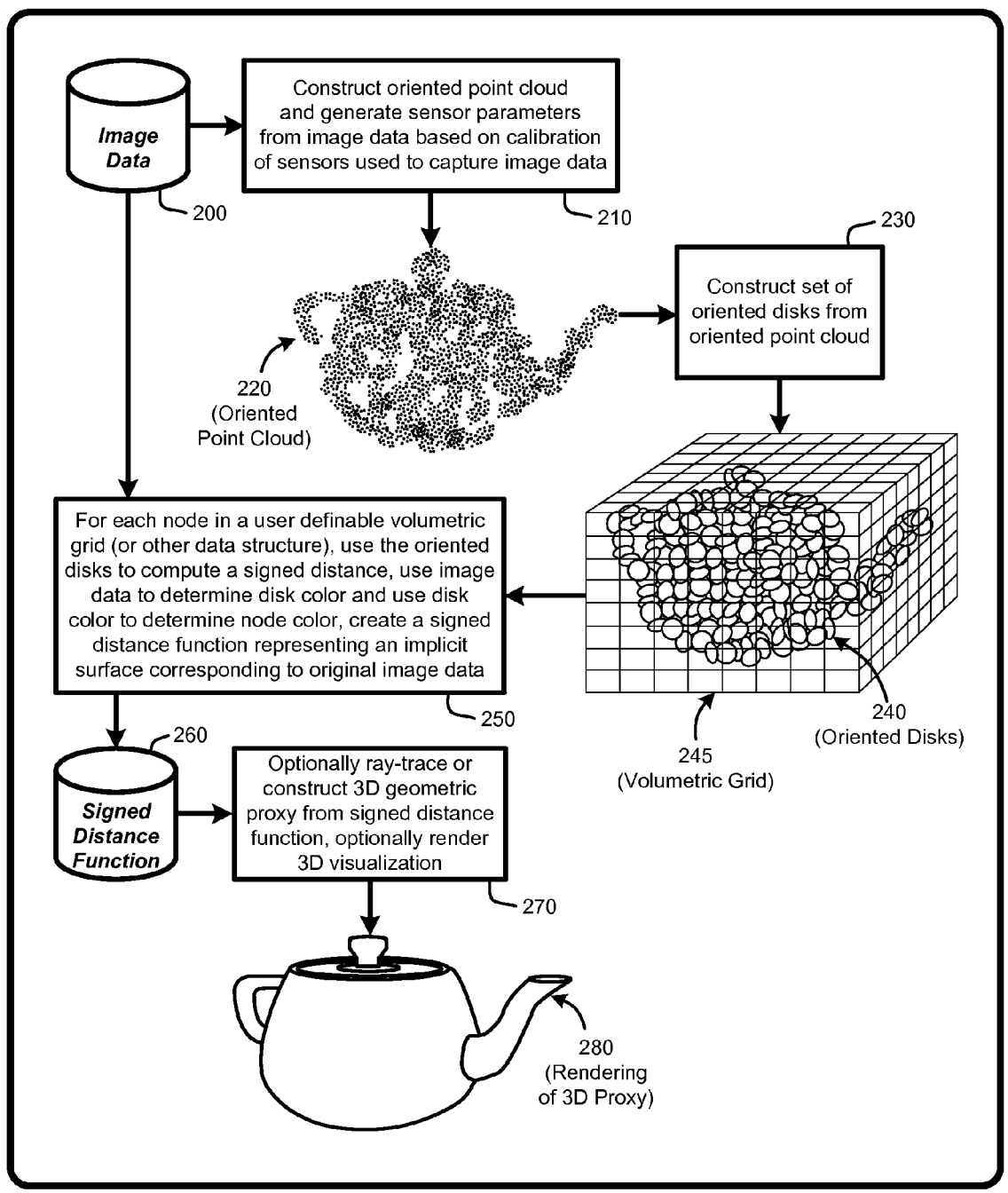
FIG. 2 illustrates a general flow diagram for implementing various embodiments of the Oriented Disk Interpolator, as described herein.

In general, as illustrated by FIG. 2, given a point cloud derived from image data 200, the Oriented Disk Interpolator begins operation by constructing 210 an oriented point cloud 220 from the original point cloud using robust estimation techniques for determining a normal direction for each point in the cloud. There are various techniques for determining normals for each point in a point cloud to create an oriented point cloud. Various examples of such techniques are described below in Section 2.2. However, it should be understood that any technique capable of creating an oriented point cloud from a point cloud (or other 3D model) is adaptable for use by various embodiments of the Oriented Disk Interpolator.

Given the oriented point cloud 220, the Oriented Disk Interpolator then defines 230 a set of oriented disks 240 from the oriented point cloud 220. More specifically, each oriented disk is defined by a corresponding point in the oriented point cloud, the normal of that point, and a radius determined based on the distances of neighboring points in the oriented point cloud. Additional details regarding defining or constructing the set of oriented disks is provided in Section 2.3.

Next, as illustrated by box 250 of FIG. 2, for each node in a user definable volumetric grid, the Oriented Disk Interpolator uses the oriented disks 240, in combination with image color data from the original 3D image data 200 to compute a signed distance and a node color. In general, the distance and color information for each node is used to construct a signed distance function 260 representing an implicit surface corresponding to the 3D image data. As discussed in further detail in Section 2.3, the Oriented Disk Interpolator applies a bilateral function of the color difference (i.e., range) and distance of each point to produce a signed distance function over the volumetric grid representing an implicit surface of the scene and/or objects used to derive the original point cloud. In other words, the implicit surface produced by the Oriented Disk Interpolator is defined as a signed distance function on a volumetric grid 245 having any desired level of fidelity (i.e., node density in the grid can be set at any desired level of fidelity). For each node of the volumetric grid 245, the Oriented Disk Interpolator computes a distance to the implicit surface relative to oriented disks corresponding to each point in the oriented point cloud.

For example, in various embodiments, the signed distance of each node is defined as the weighted average of the distance of that node to each neighboring oriented disk. Weighting for each disk is a bilateral function (generalized to oriented points in a 3D space) of the color difference (relative to RGB images, or other color space, used to create the point cloud) and distance to the disk.

As discussed in further detail in Section 2.3, the distance term in the bilateral weighting is a function of the distance from the grid node position to the closest position on the neighboring oriented disks. In various embodiments, the distance component of the bilateral weighting is a function where the weight is one when the distance is zero (i.e., the grid node or "query point" is at the disk center) and goes linearly to zero as the distance approaches the neighbor distance value (i.e., the grid node or "query point" is at the disk edge). However, it should be understood that any desired weighting function, including non-linear functions, can be used for the distance term.

Further, also as discussed in Section 2.3, in various embodiments, the range component of the bilateral weighting is partially user-defined via the use of an adjustable color parameter (see, for example, Equation (4)). In general, the Oriented Disk Interpolator projects each oriented disk into the RGB (or other color space) images from the sensor or camera array used to generate the points of the point cloud that were used to create the corresponding oriented disk. As noted above, this projection is computed using the calibration parameters. The Oriented Disk Interpolator then computes the range term based on the color difference between the projected color at all points on the disk and the color at the center. Note that the color difference or distance between any two pixels or points can be computed using any desired color distance metric, including, but not limited to, well-known metrics such as CIE94, CMC, CIE2000, Euclidean distance, Mahalanobis color distance, etc.

Finally, as illustrated by box 270 of FIG. 2, using the resulting signed distance function (SDF), the Oriented Disk Interpolator optionally ray-traces or constructs a 3D geometric proxy from the corresponding implicit surface representation of the original point cloud. The Oriented Disk Interpolator then optionally uses this information to render a 3D visualization 280 of the implicit surface represented by the signed distance function 260.

2.2 Robust Normal Estimation for Creating Oriented Point Clouds:

Various examples of techniques for determining normals for points in a point cloud are described by the aforementioned U.S. Provisional Patent Application, the subject matter of which is incorporated herein by reference. As summarized below, the Provisional Patent Application describes techniques for determining normals for points in a point cloud, and optionally generating smoothed and denoised 3D point clouds or output models, by robustly fitting planes to each point of an input point cloud and using those planes to estimate new points and corresponding normals of the 3D output model. The Oriented Disk Interpolator then uses the resulting oriented point cloud (i.e., 3D points and corresponding normals) to produce an implicit surface that can be ray-traced, meshed, or otherwise processed to produce a surface visualization or to generate high fidelity geometric proxies of any scene or object represented by a point cloud received as input.

For example, in various embodiments, given a set of 3D input points representing a point cloud, 3D mesh, or other point-based 3D model or object, determination of normal directions for each of those points begins by identifying a set of the nearest j neighbors of each input point. In various embodiments, the number of neighbors is optionally set or adjusted via a user interface. A robust estimator (e.g., RANSAC, MLESAC, LMS, MUSE, ALKS, RESC, ASSC, etc.) is then used to fit a plane in 3D space through each input point and its set of nearest neighbors. In various embodiments, the normal of each plane is then assigned to the corresponding input point to create the oriented point cloud that is then further processed by the Oriented Disk Interpolator as discussed in Section 2.3.

However, in related embodiments, instead of assigning the normal of the plane to each corresponding input point, these planes are instead used to create a smoothed set of 3D output points by projecting each input point onto its corresponding plane. The resulting intersection of the 3D input point with its corresponding plane represents the 3D spatial location of each corresponding 3D output point. The set of 3D output points is then evaluated to identify a set of the nearest k neighbors of each output point. As with the input points, a robust estimator is then used to fit a plane in 3D space through each output point and its set of nearest neighbors. The normal of each resulting plane is then assigned to the corresponding output point to create the oriented point cloud that is then further processed by the Oriented Disk Interpolator as discussed in Section 2.3.

2.3 Oriented Disks:

In general, a set, I, of images of a scene, or objects within that scene, are captured using one or more sensor arrays, such as moving or fixed camera arrays, for capturing image data. The resulting image data is used to generate the initial point cloud (for individual 3D image frames or for sequential 3D image frames of a free viewpoint video (FVV) or the like). Various techniques for determining sensor or camera calibration parameters, C, for the sensor arrays are described by the aforementioned U.S. Provisional Patent Application, the subject matter of which is incorporated herein by reference. Such calibration techniques are used to determine the intrinsic and extrinsic characteristics of any sensor in the array at any point in time. Further, as noted above, the projection of oriented disks into the images, I, as discussed below, is based on the calibration parameters, C.

Intrinsic calibration parameters such as the focal length, principal point, skew coefficient, and distortions govern the physics and optics of a given sensor. Extrinsic calibration parameters, such as rotations and translations, describe the spatial location of the sensor as well as the direction the sensor is pointing. Typically, a calibration setup procedure is carried out that is specific to the type, number, and placement of sensors. This data is often recorded in one or more calibration procedures prior to recording 3D images or videos.

Given a set of points comprising a point cloud (or other 3D model) and corresponding surface normals for each point in the point cloud (see Section 2.2), the Oriented Disk Interpolator forms a disk centered on each point using either a user adjustable radius value or a radius determined by encompassing the closest n neighboring points. Note that, in various embodiments, n is an adjustable parameter. Further, since the distance between points may vary through the point cloud, the radius around each point, and thus the radius of the corresponding oriented disk) is a variable dependent on the distance of the nearest n neighboring points. Further, in various embodiments, the radius of each oriented disk is adjustable or is defined as a weighted average of the distance of neighboring points in the cloud. In addition, other statistical treatments of the distances of neighboring points can also be used to set the radius around each point, such as, for example, using the mode of the distance to set the radius. Alternately, the radius can be entered as a user-supplied adjustable parameter.

As noted above, the disk around each point is oriented relative to the surface normal of each point. In other words, the normal and radius at each point of the point cloud define a set, S, of oriented disks for that point cloud. The oriented disk set S includes elements $q=\{q_{pos}, q_{in}, q_{rad}\}$ (i.e., disk position in 3D space, disk normal direction, and disk radius, respectively).

The disk set S is used in combination with the set, I, of images of the scene, corresponding sensor and/or camera array calibration parameters, C, and corresponding depth maps, D, to define a signed distance from each query point p (i.e., volumetric grid node) to the surface of the disk. Note that the depth maps, D, are generated from projections of each disk in S onto the RGB image (from image set I) used to create each disk (from corresponding points in the oriented point cloud). In particular, Equation (1) illustrates how the signed distance function (SDF) is determined:

$$SDF = dist(p, S) = \frac{\sum_{q \in N(p,S)} w(p, q)[q_n * (p - q_{pos})]}{\sum_{q \in N(p,S)} w(p, q)} \quad \text{Equation (1)}$$

Note that N(p, S) is the set of disks such that p is closer to the point at the center of each disk than to each disk's respective radius, namely:

$$q \in N(p,S) \text{ if } f\|p-q_{pos}\|_2 < q_{rad} \qquad \text{Equation (2)}$$

Further, w(p, q) is a weighted contribution of disk q to the distance from p to the surface of the disk. The weighting on the distance from p to q is based on the distance from the projection of the point onto the disk to the disk's center as well as the color difference between the center of the disk and the projection of the point onto the disk.

In particular, assuming that $\hat{p}_q$ is the projection of p onto q, namely $$\hat{p}_q = p - (q_n * (p - q_{pos}))q_n \qquad \text{Equation (3)}$$

then one exemplary weighting function is given by Equation (4), where:

$$w(p,q) = \left(1 - \frac{\hat{p}_q}{q_{rad}}\right) * e^{\left(-\frac{\|color(q_{pos},I,D,C) - color(\hat{p}_q,I,D,C)\|_2^2}{\sigma^2}\right)} \qquad \text{Equation (4)}$$

where color(x, I, D) returns the color at 3D point x, and σ is a user-defined color parameter. The color at any 3D point of each disk is determined by projecting that point into all images that can see that point (i.e., each image that includes that point), with the depth maps D being used to determine visibility and averaging of the colors. More generally, w(p, q) is a weighting term that combines distance and color and can be considered as a bilateral filter generalized to oriented points in a 3D space. As noted above, any desired weighting term can be used in place of the weighting function illustrated by Equation (4).

2.4 Constructing Geometric Proxies from the SDF:

As noted above, the implicit surface produced by the Oriented Disk Interpolator is defined as a signed distance function on a volumetric grid. Consequently, given the signed distance function, the implicit surface can be ray-traced, meshed, or otherwise processed using any of a large number of methods to create a high fidelity geometric proxy. Such techniques are well known to those skilled in the art and will not be described herein.

Figure 3:
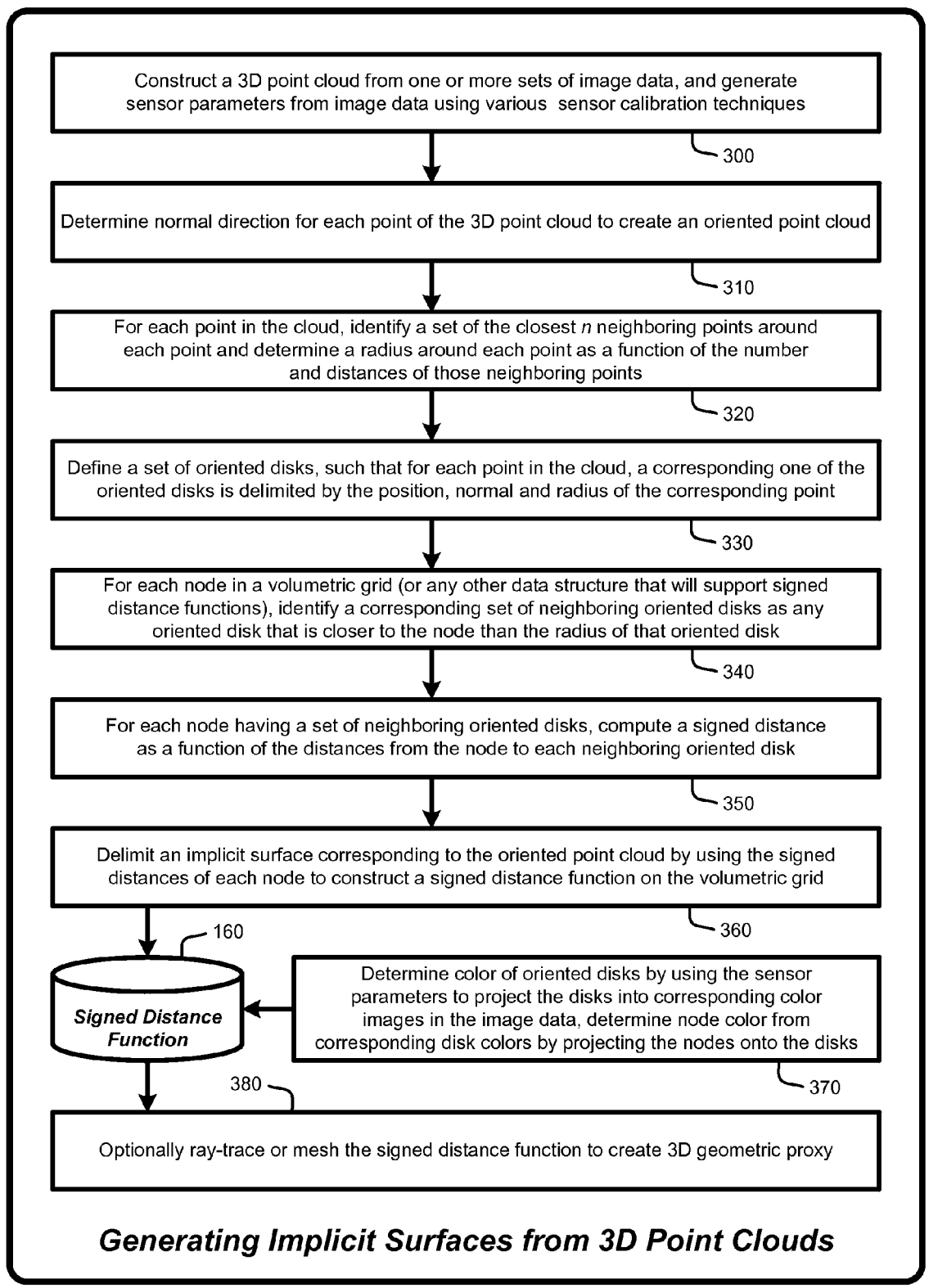
FIG. 3 illustrates a general system flow diagram that illustrates exemplary methods for implementing various embodiments of the Oriented Disk Interpolator, as described herein.

3.0 Operational Summary of the Oriented Disk Interpolator:

The processes described above with respect to FIG. 1 and FIG. 2 and in further view of the detailed description provided above in Sections 1 and 2 are illustrated by the general operational flow diagram of FIG. 3. In particular, FIG. 3 provides an exemplary operational flow diagram that summarizes the operation of some of the various embodiments of the Oriented Disk Interpolator.

Note that FIG. 3 is not intended to be an exhaustive representation of all of the various embodiments of the Oriented Disk Interpolator described herein, and that the embodiments represented in FIG. 3 are provided only for purposes of explanation.

Further, it should be noted that any boxes and interconnections between boxes that may be represented by broken or dashed lines in FIG. 3 represent optional or alternate embodiments of the Oriented Disk Interpolator described herein, and that any or all of these optional or alternate embodiments, as described below, may be used in combination with other alternate embodiments that are described throughout this document.

In general, as illustrated by FIG. 3, the Oriented Disk Interpolator begins operation by constructing 300 a 3D point cloud from one or more sets of 3D image data. The Oriented Disk Interpolator then determines 310 a normal direction for each point of the 3D point cloud to create an oriented point cloud. Next, for each point in the cloud, the Oriented Disk Interpolator identifies 320 a set of the closest n neighboring points around each point and determines a radius around each point as a function of the number and distances of those neighboring points.

Given the oriented point cloud with normal directions and radius values for each point, the Oriented Disk Interpolator defines 330 a set of oriented disks, such that for each point in the cloud, a corresponding one of the oriented disks is delimited by the position, normal and radius of the corresponding point. For each node in a volumetric grid, the Oriented Disk Interpolator then identifies 340 a corresponding set of neighboring oriented disks as any oriented disk that is closer to the node than the radius of that oriented disk.

For each node having a set of neighboring oriented disks, the Oriented Disk Interpolator then computes 350 a signed distance as a function of the distances from the node to each neighboring oriented disk. This information is then used by the Oriented Disk Interpolator to delimit 360 an implicit surface corresponding to the oriented point cloud by using the signed distances of each node to construct a signed distance function 160 on the volumetric grid. In addition, the Oriented Disk Interpolator determines 370 the color of oriented disks from color images in 3D image data and then determines each node color from corresponding disk colors, as discussed in Section 2.3.

Finally, as illustrated by box 380 of FIG. 3, the Oriented Disk Interpolator optionally ray-traces or meshes the signed distance function to create a 3D geometric proxy or other 3D visualization or rendering.

Figure 4:
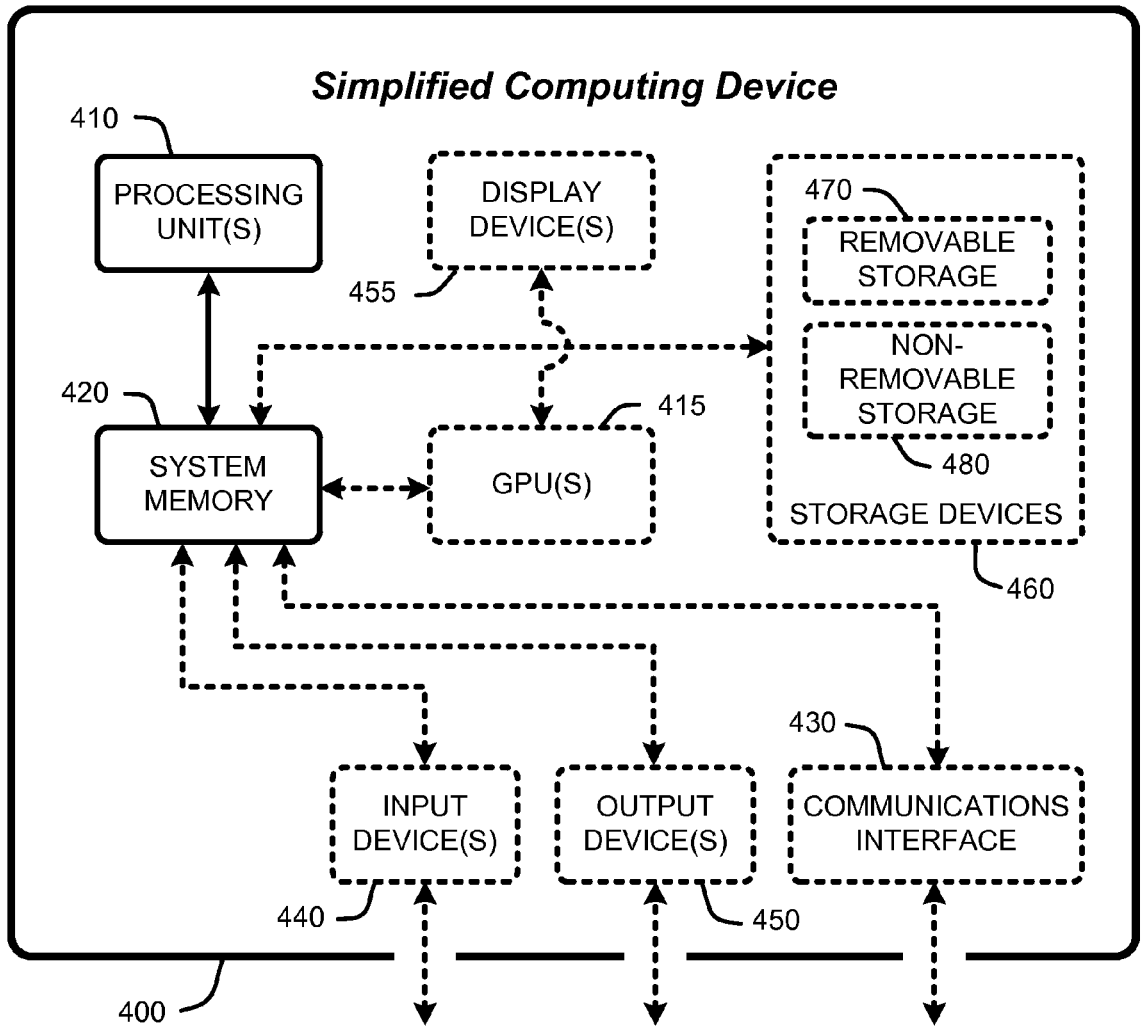
FIG. 4 is a general system diagram depicting a simplified general-purpose computing device having simplified computing and I/O capabilities for use in implementing various embodiments of the Oriented Disk Interpolator, as described herein.

4.0 Exemplary Operating Environments:

The Oriented Disk Interpolator described herein is operational within numerous types of general purpose or special purpose computing system environments or configurations. FIG. 4 illustrates a simplified example of a general-purpose computer system on which various embodiments and elements of the Oriented Disk Interpolator, as described herein, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device such as computer 400. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the Oriented Disk Interpolator, the device should have a sufficient computational capability and system memory to enable basic computational operations. In particular, as illustrated by FIG. 4, the computational capability is generally illustrated by one or more processing unit(s) 410, and may also include one or more GPUs 415, either or both in communication with system memory 420. Note that that the processing unit(s) 410 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 430. The simplified computing device of FIG. 4 may also include one or more conventional computer input devices 440 (e.g., pointing devices, keyboards, audio input devices, video input devices, haptic input devices, devices for receiving wired or wireless data transmissions, etc.). The simplified computing device of FIG. 4 may also include other optional components, such as, for example, one or more conventional computer output devices 450 (e.g., display device(s) 455, audio output devices, video output devices, devices for transmitting wired or wireless data transmissions, etc.). Note that typical communications interfaces 430, input devices 440, output devices 450, and storage devices 460 for general-purpose computers are well known to those skilled in the art, and will not be described in detail herein.

The simplified computing device of FIG. 4 may also include a variety of computer readable media. Computer readable media can be any available media that can be accessed by computer 400 via storage devices 460 and includes both volatile and nonvolatile media that is either removable 470 and/or non-removable 480, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Oriented Disk Interpolator described herein, or portions thereof, may be stored, received, transmitted, or read from any desired combination of computer or machine readable media or storage devices and communication media in the form of computer executable instructions or other data structures.

Finally, the Oriented Disk Interpolator described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Oriented Disk Interpolator has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Oriented Disk Interpolator. It is intended that the scope of the invention be limited not by this detailed description, but rather by the claims appended hereto.

What is claimed is:

1. A computer-implemented process for constructing implicit surfaces from point clouds, comprising using a computing device to perform process actions for:
   receiving an oriented point cloud, each point in the cloud having a normal direction;
   for each point in the cloud, identifying a set of closest neighboring points within a radius around each point;
   defining a set of oriented disks, such that for each point in the cloud, a corresponding one of the oriented disks is delimited by the position, normal and radius of the corresponding point;
   for each node in a volumetric grid, identifying a corresponding set of neighboring oriented disks as any oriented disk that is closer to the node than the radius of that oriented disk;
   for each node having a set of neighboring oriented disks, computing a signed distance as a weighted average of a signed distance to each neighboring oriented disk; and
   delimiting an implicit surface corresponding to the oriented point cloud by using the signed distances of each node to construct a signed distance function on the volumetric grid.

2. The computer-implemented process of claim 1 wherein:
   a number, n, of closest neighboring points for each point in the oriented point cloud is an adjustable parameter; and
   wherein the radius around each point, and thus the radius of each corresponding oriented disk, varies to encompass n neighboring points.

3. The computer-implemented process of claim 1 wherein the radius around each point is computed as a weighted average of the distances to the set of neighboring points.

4. The computer-implemented process of claim 1 further comprising receiving a plurality of color images representing 3D image data of a scene and wherein the oriented point cloud is derived based on the 3D image data.

5. The computer-implemented process of claim 4 further comprising determining oriented disk colors by projecting each oriented disk into each of the color images in which the oriented disk is visible relative to a geometry of corresponding sensor calibration parameters.

6. The computer-implemented process of claim 5 wherein a color of each grid node is determined by projecting each grid node onto each neighboring oriented disk, and computing a bilateral function of the differences of the oriented disk colors and a distance to the oriented disk from the corresponding node.

7. The computer-implemented process of claim 1 further comprising ray-tracing the implicit surface to create a 3D surface visualization of the implicit surface.

8. The computer-implemented process of claim 1 further comprising meshing the implicit surface to create a 3D geometric proxy.

9. The computer-implemented process of claim 1 wherein a density of the nodes in the volumetric grid is an adjustable parameter.

10. A computer-readable memory device having computer executable instructions stored therein for generating implicit surfaces from point clouds, said instructions causing a computing device to execute a method comprising:
 constructing a point cloud from 3D image data of a scene and determining a normal for each point to create an oriented point cloud;
 for each point in the cloud, identifying a set of the closest n neighboring points around each point and determining a radius around each point as a function of the number and distances of those neighboring points;
 defining a set of oriented disks, such that for each point in the cloud, a corresponding one of the oriented disks is delimited by the position, normal and radius of the corresponding point;
 for each node in a volumetric grid, identifying a corresponding set of neighboring oriented disks as any oriented disk that is closer to the node than the radius of that oriented disk;
 for each node having a set of neighboring oriented disks, computing a signed distance as a function of the distances from the node to each neighboring oriented disk; and
 delimiting an implicit surface corresponding to the oriented point cloud by using the signed distances of each node to construct a signed distance function on the volumetric grid.

11. The computer-readable memory device of claim 10 wherein the number, n, of the closest neighboring points is an adjustable parameter.

12. The computer-readable memory device of claim 10 wherein the radius around each point is computed as a weighted average of the distances to the set of neighboring points.

13. The computer-readable memory device of claim 10 further comprising determining oriented disk colors from the 3D image data.

14. The computer-readable memory device of claim 13 wherein a color of each grid node is determined based on the colors of each neighboring oriented disk.

15. The computer-readable memory device of claim 10 further comprising ray-tracing the implicit surface to create a 3D surface visualization of the 3D image data.

16. The computer-readable memory device of claim 10 further comprising meshing the implicit surface to create a 3D geometric proxy of the 3D image data.

17. A computer-implemented process for creating an implicit surface representation of a 3D scene, comprising using a computing device to perform process actions for:
 constructing a point cloud from 3D image data of a scene and determining a normal for each point to create an oriented point cloud;
 for each point in the cloud, identifying a set of the closest n neighboring points around each point and determining a radius around each point as a function of the number and distances of those neighboring points;
 defining a set of oriented disks, such that for each point in the cloud, a corresponding one of the oriented disks is delimited by the position, normal and radius of the corresponding point;
 determining oriented disk colors from the 3D image data;
 for each node in a volumetric grid, identifying a corresponding set of neighboring oriented disks as any oriented disk that is closer to the node than the radius of that oriented disk;
 for each node having a set of neighboring oriented disks, computing a signed distance as a function of the distances from the node to each neighboring oriented disk;
 determining a color of each grid node based on the colors of each neighboring oriented disk; and
 delimiting an implicit surface corresponding to the oriented point cloud by using the signed distances and colors of each node to construct a signed distance function on the volumetric grid.

18. The computer-implemented process of claim 17 wherein the number, n, of the closest neighboring points is an adjustable parameter.

19. The computer-implemented process of claim 17 wherein the radius around each point is computed as a weighted average of the distances to the set of neighboring points.

20. The computer-implemented process of claim 17 further comprising using the signed distance function to construct a 3D geometric proxy of the 3D image data.

* * * * *